(12) United States Patent
Yamaguchi et al.

(10) Patent No.: US 7,030,402 B2
(45) Date of Patent: *Apr. 18, 2006

(54) OPTICAL DISTANCE MEASURING DEVICE AND PRINTING APPARATUS USING THE SAME

(75) Inventors: Akifumi Yamaguchi, Kashiba (JP); Hisakazu Sugiyama, Nara-ken (JP)

(73) Assignee: Sharp Kabushiki Kaisha, Osaka (JP)

( * ) Notice: Subject to any disclaimer, the term of this patent is extended or adjusted under 35 U.S.C. 154(b) by 194 days.

This patent is subject to a terminal disclaimer.

(21) Appl. No.: 10/435,453

(22) Filed: May 12, 2003

(65) Prior Publication Data

US 2003/0213924 A1    Nov. 20, 2003

(30) Foreign Application Priority Data

May 14, 2002   (JP) .............................. 2002-138331

(51) Int. Cl.
 *G01N 21/86* (2006.01)
(52) U.S. Cl. ........................... 250/559.38; 250/559.27; 356/630
(58) Field of Classification Search ................ 250/216, 250/559.38, 559.27, 559.28; 356/3.03–3.08, 356/3, 4.01–4.1, 625, 630, 634, 635; 347/19, 347/104, 105; 271/262, 263, 265.04

See application file for complete search history.

(56) References Cited

U.S. PATENT DOCUMENTS

| | | | | | |
|---|---|---|---|---|---|
| 5,971,519 | A | * | 10/1999 | Horikoshi | ...................... 347/16 |
| 6,043,869 | A | * | 3/2000 | Uno et al. | ...................... 356/28 |
| 6,257,692 | B1 | * | 7/2001 | Yokoi et al. | ................... 347/16 |
| 6,291,829 | B1 | * | 9/2001 | Allen et al. | ............. 250/559.07 |
| 6,492,637 | B1 | * | 12/2002 | Fujita | ...................... 250/231.13 |
| 6,561,643 | B1 | * | 5/2003 | Walker et al. | ............... 347/105 |
| 6,657,216 | B1 | * | 12/2003 | Poris | ...................... 250/559.22 |
| 6,674,517 | B1 | * | 1/2004 | Yamaguchi et al. | ........... 356/28 |
| 6,712,446 | B1 | * | 3/2004 | Huffman | ...................... 347/19 |
| 2003/0052934 | A1 | * | 3/2003 | Maruyama | ...................... 347/16 |

FOREIGN PATENT DOCUMENTS

| | | |
|---|---|---|
| JP | 01-240812 A | 9/1989 |
| JP | 05-240640 A | 9/1993 |

* cited by examiner

*Primary Examiner*—Stephone B. Allen
*Assistant Examiner*—Davienne Monbleau
(74) *Attorney, Agent, or Firm*—Birch, Stewart, Kolasch & Birch, LLP

(57) ABSTRACT

An optical distance measuring device has an objective lens that condenses light from a light emission element to irradiate a measuring object and to form on the measuring object a light spot having a diameter not smaller than 10 μm and not larger than 30 μm. A light receiving lens condenses light reflected from the light spot on the measuring object to make the light incident on a photodetector through a pinhole having a diameter not smaller than 10 μm and not larger than 50 μm. With movement of the measuring object, detection signal of which an amplitude and an output level change according to a distance to the measuring object is obtained from the photodetector.

10 Claims, 4 Drawing Sheets

OPTICAL DISTANCE MEASURING DEVICE AND PRINTING APPARATUS USING THE SAME

BACKGROUND OF THE INVENTION

The present invention relates to an optical distance measuring device for measuring a distance without contact and to a printing apparatus using the same.

FIG. 7 shows a configuration of an optical distance measuring device of a background art. In FIG. 7, light emitted by luminescence of a light emission element 1 is collimated by a collimating lens 2 and thereafter irradiates a measuring object 3. Reflected light from the measuring object 3 is condensed by a condensing lens 4 and is subsequently made incident on a photodetector 5. In this arrangement, a position of a spot of the light incident on the photodetector 5 varies according to a distance between the condensing lens 4 and the measuring object 3, as shown by dashed lines.

As the photodetector 5, therefore, a position sensing device (PSD) is used of which an output varies according to the position of the spot of the incident light. The distance from the optical distance measuring device to the measuring object 3 is thus detected by the position sensing device 5.

In an optical distance measuring device of a background art shown in FIG. 8, light emitted by luminescence of a light emission element 6 is condensed by a lens 7 so as to be slightly focused relative to parallel light and thereafter irradiates a measuring object 8. Reflected light from the measuring object 8 is condensed by a condensing lens 9 and is subsequently made incident on a photodetector 10. In this arrangement, a size (i.e., a spot diameter) of an image formed on the photodetector 10 varies according to a distance between the condensing lens 9 and the measuring object 8, as shown by dashed lines.

As the photodetector 10, therefore, an image sensor is used that has a light receiving surface divided into a number of regions in a two-dimensional manner. The spot size is detected by the image sensor 10 and the distance from the optical distance measuring device to the measuring object 8 is thereby detected.

In printing apparatus such as copying machines, printers, and facsimiles, such an optical distance measuring device as described above is used for detecting a thickness of a paper form without contact in order to improve printing quality.

The conventional optical distance measuring devices, however, have such problems as follows. That is, the conventional optical distance measuring devices use the method in which the measuring object 3, 8 is irradiated vertically with light from the light emission element 1, 6 and in which only light with specified angles of reflection out of light having undergone diffused reflection by the measuring object 3, 8 is condensed and is made incident on the photodetector 5, 10 (trigonometrical distance measuring method). Accordingly, the measuring object 3, 8 having a mirror surface or a close-to-mirror surface does not cause diffused reflection and thus makes it impossible to measure the distance thereto.

On condition that the distance between the measuring object 3, 8 and the optical distance measuring device is too small, besides, it may be impossible to measure the distance because light having undergone diffused reflection by the measuring object 3, 8 may not be advantageously incident on the photodetector 5, 10. Owing to use of light having undergone diffused reflection by the measuring object 3, 8, moreover, the position or diameter of the spot on the photodetector 5, 10 does not change greatly with change in the distance between the measuring object 3, 8 and the optical distance measuring device. It is therefore difficult to accurately detect a minute change in the distance.

It is an object of the present invention to provide an optical distance measuring device that is capable of measuring accurately a distance to a measuring object and a change in the distance even if a surface of the measuring object is a mirror surface or close to a mirror surface, even if the distance to the measuring object is small, or even if a change in the distance to the measuring object is minute, and to provide a printing apparatus using the same.

SUMMARY OF THE INVENTION

In order to achieve the object, an optical distance measuring device in accordance with a first aspect of the invention condenses light from a light emission element by an objective lens to form a light spot on a surface of a measuring object that is moving, which surface extends along a direction of the movement. The device condenses reflected light from the light spot by a light receiving lens to make the light incident on a photodetector through a pinhole. A distance to the measuring object is measured by distance measuring means on basis of light reception signal from the photodetector according to a quantity of the incident light.

Thus the reflected light from the light spot with a minute diameter that is formed by the objective lens on the measuring object that is moving is condensed by the light receiving lens and is made incident on the photodetector through the pinhole. As a result, light reception signal having a large amplitude is obtained from the photodetector with the movement of the measuring object. With an increase in the distance to the measuring object, the diameter of the light spot increases and therefore a waveform and an output level of the light reception signal change greatly according to the distance. Accordingly, the distance and a change in the distance are measured accurately by the distance measuring means on basis of the waveform of the light reception signal even if the distance to the measuring object and the change in the distance are minute.

Besides, the distance and the change in the distance can be measured even if the surface of the measuring object is a mirror surface or close to a mirror surface, because the distance to the measuring object and the change in the distance are measured on basis of the reflected light from the light spot with the minute diameter.

In an optical distance measuring device of an embodiment, the distance measuring means is configured so as to measure the distance on basis of the output level and the amplitude of the light reception signal that change greatly according to the distance to the measuring object. Thus the distance to the measuring object and the change in the distance are measured easily on basis of the waveform of the light reception signal.

In one embodiment of the present invention, the light emission element is a semiconductor laser. Thus condensing by the objective lens is done efficiently and the sufficient quantity of reflected light for the photodetector to output a detection signal is obtained.

In one embodiment of the present invention, an axis of irradiation light irradiated on the measuring object and an axis of reflected light from the measuring object are positioned on one straight line, wherein a beam splitter is provided between the light emission element and the objective lens, and wherein the light receiving lens, the pinhole, and the photodetector are positioned on an axis of the reflected light of which a direction has been changed by the beam splitter. Thus an unchanging path of the reflected light is provided regardless of the distance to the measuring object, and the distance to the measuring object and the change in the distance are measured stably even if the distance is increased.

In this arrangement, an optical system associated with light emission from the light emission element and an optical system associated with light incidence on the photodetector are provided separately and detection signal is obtained from the photodetector without interference between the systems.

In one embodiment of the present invention, the axis of the irradiation light irradiated on the measuring object is perpendicular to the irradiated surface of the measuring object. Thus the distance to the measuring object having a mirror surface or a close-to-mirror surface can be measured on condition that the axis of the erradiating light on the measuring object and the axis of the light reflected by the measuring object are positioned on the same straight line.

In an optical distance measuring device of one embodiment, a diameter of the light spot formed on the measuring object is set so as to be not smaller than 10 μm and not larger than 30 μm. Thus a quantity of light sufficient for the detection of the distance and the change in the distance is obtained on condition that only light condensed by the light receiving lens and having passed through the pinhole out of light reflected from the light spot formed on the measuring object is incident on the photodetector.

In an optical distance measuring device of one embodiment, a diameter of the pinhole is set so as to be not larger than 50 μm. Thus information on a condition of the surface is prevented from being averaged by reflected light from a large area on the measuring object and a difference due to the change in the distance to the measuring object is thus prevented from being decreased. Moreover, the diameter of the pinhole is set so as to be not smaller than 10 μm. This setting prevents the detection signal from being insufficient for the detection because of an insufficient quantity of light.

In one embodiment of the present invention, the pinhole-formed body is formed integrally on the photodetector. Thus the size and position of the pinhole can be set with a high accuracy by semiconductor processes. Moreover, cost reduction can be achieved.

In one embodiment of the present invention, the optical distance measuring device further comprises a guide section that guides movement of the measuring object when the measuring object is moving. Thus the distance to the measuring object that is moving and the change in the distance can be measured accurately and stably even if the measuring object is such a flexible one as a paper form.

In a printing apparatus in accordance with a second aspect of the invention, a paper forms thickness detecting device including the optical distance measuring device in accordance with the first aspect of the invention detects a thickness of a paper form as the measuring object. On input of the detected thickness of the paper form, a drum drive control section controls a position of a fixing drum so that a distance between a drum and the fixing drum matches with the thickness of the paper form. Thus the distance between the drum and the fixing drum is set according to the thickness of the paper form that has been measured accurately, so that fixed state is optimized and so that high picture quality is achieved.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
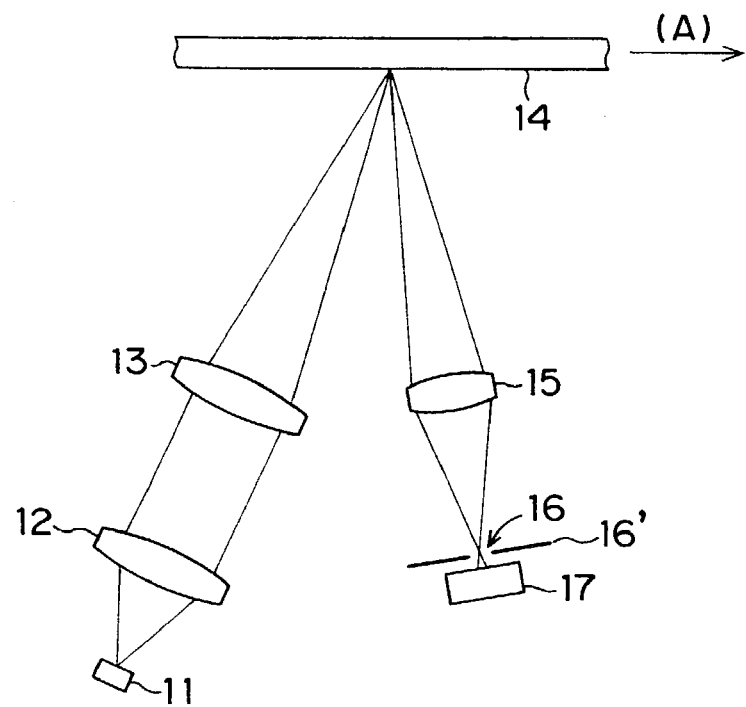
FIG. 1 is a schematic configuration of an optical distance measuring device of the invention.

Hereinbelow, the invention will be described in detail with reference to embodiments shown in the drawings.

(First Embodiment)

FIG. 1 is a schematic configuration of an optical distance measuring device of the embodiment. In FIG. 1, light emitted by luminescence of a light emission element (preferably, a semiconductor laser) 11 is collimated by a collimating lens 12 and is thereafter irradiated by an objective lens 13 on a measuring object 14 that is moving in a direction of an arrow (A). Light reflected by the measuring object 14 is condensed by a light receiving lens 15 and is subsequently made incident on a photodetector 17 through a pinhole 16 formed in a pinhole-formed body 16'.

In this arrangement, a spot diameter of a light spot irradiated on the measuring object 14 is not smaller than 10 μm and not larger than 30 μm, and light incident on the photodetector 17 is limited only to light condensed by the light receiving lens 15 and having passed through the pinhole 16 out of light reflected by the measuring object 14. This means that the photodetector 17 detects a surface condition of a minute area (tens of microns square) on the measuring object 14. When the measuring object 14 moves, a detection signal output from the photodetector 17 therefore fluctuates greatly as shown by a curved line (a) in FIG. 3. A diameter of the pinhole 16 is set so as to be not smaller than 10 μm and not larger than 50 μm. This arrangement makes it possible to precisely read the surface condition of the measuring object 14 and to obtain an appropriate quantity of light.

Figure 2:
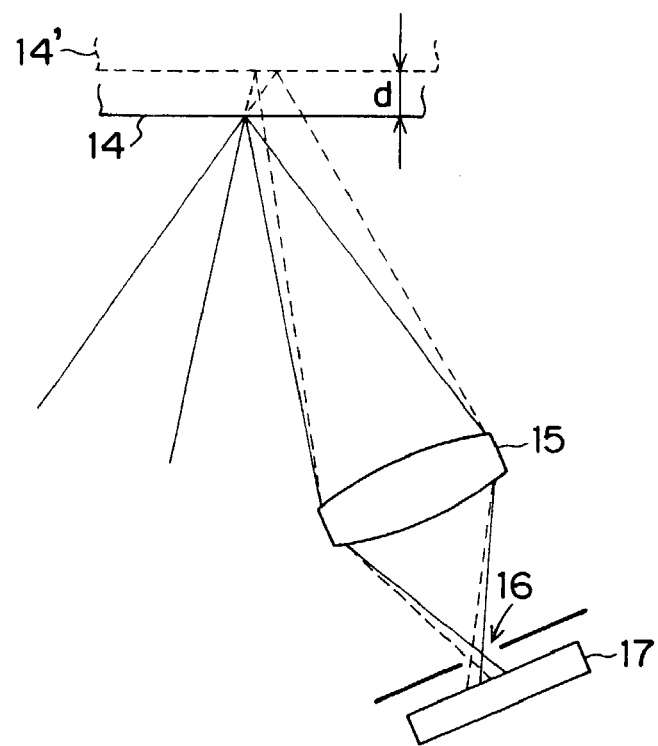
FIG. 2 is a diagram showing a relation among a measuring object, a light receiving lens, a pinhole, and a photodetector on occasion of a change in a distance to the measuring object in a situation shown in FIG. 1.

Hereinbelow, a consideration will be given to a case that the distance to the measuring object 14 changes (increases by d) in the above state. FIG. 2 shows a relation among the measuring object 14, the light receiving lens 15, the pinhole 16, and the photodetector 17 in this case. With the increase in the distance to the measuring object 14, as is evident from FIG. 2, the light spot diameter on the measuring object 14 increases and the photodetector 17 receives through the pinhole 16 the reflected light from an area of object 14 larger than the minute area before the change in the distance. That is, the photodetector detects a more averaged surface condition.

Figure 3:
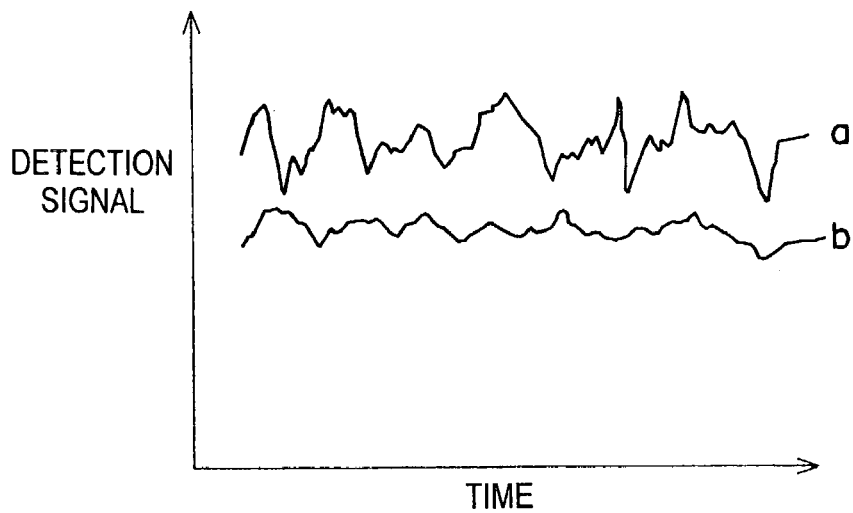
FIG. 3 is a diagram showing a change of detection signal from the photodetector according to distances to the measuring object in FIGS. 1 and 2.

Thus the increase in the distance to the measuring object 14 reduces the fluctuation and the output level of the detection signal output from the photodetector 17, as shown by a curved line (b) in FIG. 3. Accordingly, to detect the fluctuation range and the output level of the detection signal from the photodetector 17 makes it possible to detect the distance to the measuring object 14 that is moving in the direction of the arrow (A) and to detect a change in the distance.

In the embodiment, as described above, light from the light emission element 11 is condensed by the objective lens 13 so as to be irradiated on the measuring object 14 that is moving and so as to form the light spot on the measuring object 14. Then light reflected by the measuring object 14 from the light spot is condensed by the light receiving lens 15 and is subsequently made incident on the photodetector 17 through the pinhole 16. With the movement of the measuring object 14, accordingly, the photodetector 17 outputs the detection signal of which a waveform, i.e., an amplitude and an output level, changes according to the distance to the measuring object 14. On condition that the surface of the measuring object 14 is a mirror surface or close to a mirror surface, however, the detection signal of which an output level differs according to the distance is output.

The amplitude and output level of the detection signal can be detected accurately with amplification of the detection signal by an amplifier or wave filtration of the signal by a filter circuit, for example, and with combinatorial use of various detectors and arithmetic processing means such as microcomputer. In accordance with the embodiment, therefore, the distance to the measuring object 14 and a change in the distance can be measured accurately even if the surface of the measuring object 14 is a mirror surface or a close-to-mirror surface, even if the distance to the measuring object 14 is small, or even if the change in the distance to the measuring object 14 is minute. That is, in the embodiment, the distance measuring means is composed of the signal processing circuit, the detector, and the arithmetic processing means.

Use of a semiconductor laser as the light emission element 11 allows efficient condensing by the condensing lens 13. Thus the reflected light can be obtained that has sufficient quantity of light for the photodetector 17 to output the detection signal.

The spot diameter of the light spot formed on the measuring object 14 is set so as to be not smaller than 10 μm and not larger than 30 μm. With this setting, a quantity of light required for the detection of the distance and the change in the distance can be obtained even if only a part of light that reflected light from the light spot on the measuring object 14 is condensed by the light receiving lens 15, has passed through the pinhole 16 and is incident on the photodetector 17. As a result, the distance and the change in the distance can be detected more accurately.

The diameter of the pinhole 16 is set so as to be not smaller than 10 μm and not larger than 50 μm. With this setting, the surface condition of the measuring object 14 can be read precisely and an appropriate quantity of light can be obtained, so that the distance and the change in the distance can be detected more accurately.

In the embodiment, the pinhole-formed body 16' is formed independently of the photodetector 17. The pinhole-formed body, however, may be formed as a mask on a light-receiving surface of the photodetector 17. In this arrangement, the pinhole and the photodetector are integrated, so that the size and position of the pinhole can be set with a high accuracy. Moreover, cost reduction can be achieved.

(Second Embodiment)

In accordance with the optical distance measuring device of the first embodiment, as described above, the distance to the measuring object 14 and the change in the distance can be measured accurately. An increase in the distance from the optical distance measuring device to the measuring object 14, however, makes it difficult to cause incidence on the photodetector 17 of light reflected by the measuring object 14.

On condition that a quantity d of the change in the distance is increased in FIG. 2, an angle formed between an axis of light reflected by the measuring object 14' and condensed by the light receiving lens 15 and the irradiated surface becomes larger than in case where the quantity d is zero. In consequence, light reflected by the measuring object 14' may deviate so as not to pass through the pinhole 16 and thus a state may occur in which a light reception signal is not output from the photodetector 17. This embodiment relates to an optical distance measuring device that is capable of dealing with such a case.

Figure 4:
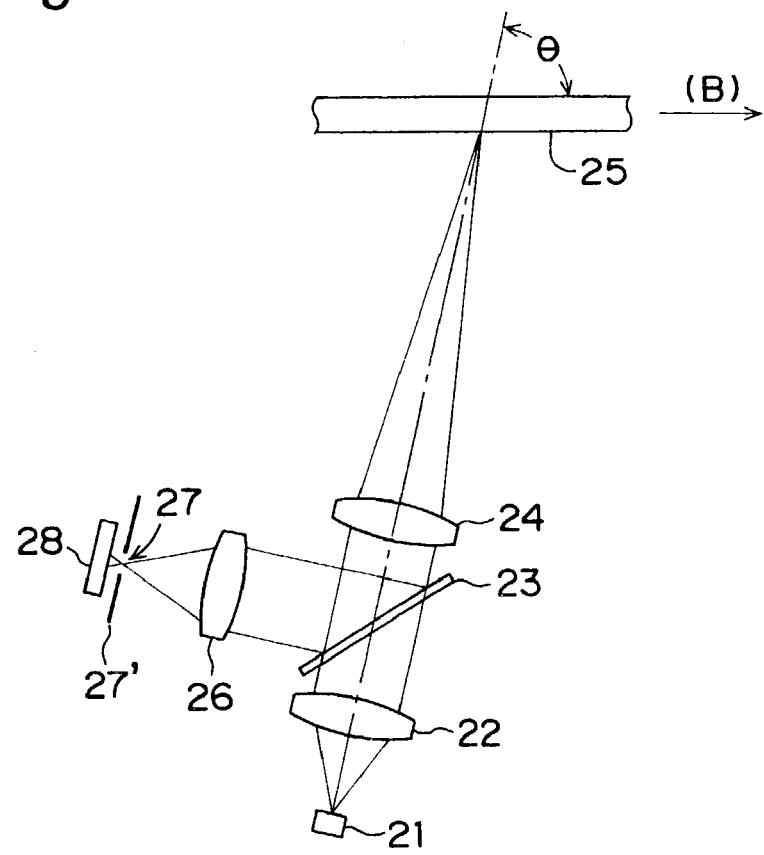
FIG. 4 is a schematic configuration of an optical distance measuring device different from that of FIG. 1.

FIG. 4 is a schematic configuration of the optical distance measuring device of the embodiment. In FIG. 4, light emitted by luminescence of a light emission element (preferably, a semiconductor laser) 21 is collimated by a collimating lens 22, is subsequently penetrated through a beam splitter 23, and is irradiated by an objective lens 24 on a measuring object 25 that is moving in a direction of an arrow (B). Light reflected by the measuring object 25 returns on the same path, and is collimated by the objective lens 24. A direction of an axis of the light is then changed by the beam splitter 23 so that the light is guided to a light receiving lens 26. The light condensed by the light receiving lens 26 is made incident on a photodetector 28 through a pinhole 27 formed in a pinhole-formed body 27'.

In the embodiment, an axis of the light incident on the measuring object 25 and the axis of the light reflected by the measuring object 25 are thus positioned on the same straight line. This arrangement provides the unchanging path of the reflected light from the measuring object 25 regardless of a distance between the optical distance measuring device and the measuring object 25 and ensures that rays of light reflected by the measuring object 25 are made incident on the photodetector 28 through the pinhole 27 at all times. Thus the distance and the change in the distance can be detected even if the distance to the measuring object 25 changes greatly.

A principle of measurement of the distance to the measuring object 25 and the change in the distance in the optical distance measuring device of the embodiment is exactly the same as that in the optical distance measuring device of the first embodiment. That is, an amplitude and an output level of detection signal, as shown in FIG. 3, that is output from the photodetector 28 according to the distance to the measuring object 25 are detected by the distance measuring means composed of the signal processing circuit, the detector, and the arithmetic processing means, and the measurement is thereby executed.

On condition that, in this arrangement, an angle θ which an axis of light incident on the measuring object 25 (i.e., reflected light from the measuring object 25) forms with a surface of the measuring object 25 is other than 90 degrees (not perpendicular to the surface) and that the surface of the measuring object 25 is a mirror surface or a close-to-mirror surface, light reflected by the measuring object 25 does not return to the objective lens 24. In such a case, the detection can be done with the angle θ set at 90 degrees (perpendicular to the surface), even if the surface of the measuring object 25 is a mirror surface or a close-to-mirror surface. In a state shown in FIG. 4, as a matter of course, the distance to the measuring object 25 having the surface that is not a mirror surface can be detected.

Also in the embodiment, it is necessary to set a diameter of the pinhole 27 not smaller than 10 μm and not larger than 50 μm in order that the surface condition of the measuring object 25 may be read and in order that an appropriate quantity of light may be obtained. If the diameter is larger than 50 μm, the surface condition is supposed to be read on basis of reflected light from a wide area on the measuring object 25. As a result, information on the surface condition is averaged so as to differ little according to positions of the measuring object 25 and thus a true surface condition (i.e., a true distance and a true change in the distance) cannot be detected. If the diameter is smaller than 10 μm, the surface condition can be read precisely but the detection signal sufficient for the detection cannot be obtained because of an insufficient quantity of light.

Preferably, the pinhole-formed body 27' is provided as a metal mask that can be formed by semiconductor processes on a light receiving surface of the photodetector 28 and has a structure such that the pinhole-formed body 27' and the photodetector 28 are integrated.

In the embodiment, as described above, light from the light emission element 21 is penetrated through the beam splitter 23, is condensed by the objective lens 24, and is irradiated on the measuring object 25 that is moving, so that a light spot is formed on the measuring object 25. Light reflected from the light spot by the measuring object 25 is collimated by the objective lens 24, and the direction of the axis of the light is thereafter changed by the beam splitter 23 so that the light is guided to the light receiving lens 26. The light condensed by the light receiving lens 26 is made incident on the photodetector 28 through the pinhole 27.

Accordingly, the axis of the light incident on the measuring object 25 and the axis of the reflected light from the measuring object 25 are identical so that the light reflected by the measuring object 25 is made incident on the photodetector 28 through the pinhole 27 at all times regardless of a distance between the objective lens 24 and the measuring object 25. In consequence, the distance and the change in the distance can be detected on basis of the amplitude and output level of the detection signal from the photodetector 28 even if the distance to the measuring object 25 is large.

In this arrangement, efficient condensing by the condensing lens 24 can be done with use of a semiconductor laser as the light emission element 21. As a result, the reflected light can be obtained that has a quantity of light required for the photodetector 28 to output the detection signal.

A spot diameter of the light spot that is formed on the measuring object 25 is set so as to be not smaller than 10 μm and not larger than 30 μm. Thus a quantity of light can be obtained that is required for the detection of the distance and the change in the distance. As a result, the distance and the change in the distance can be detected more accurately. The diameter of the pinhole 27 is set so as to be not smaller than 10 μm and not larger than 50 μm. This arrangement makes it possible to precisely read the surface condition of the measuring object 25 and to obtain an appropriate quantity of light and thus makes it possible to detect the distance and the change in the distance more accurately.

In the embodiment, the pinhole-formed body 27' and the photodetector 28 are integrated, so that the size and position of the pinhole can be set with a high accuracy. Moreover, cost reduction can be achieved.

(Third Embodiment)

Figure 5A:
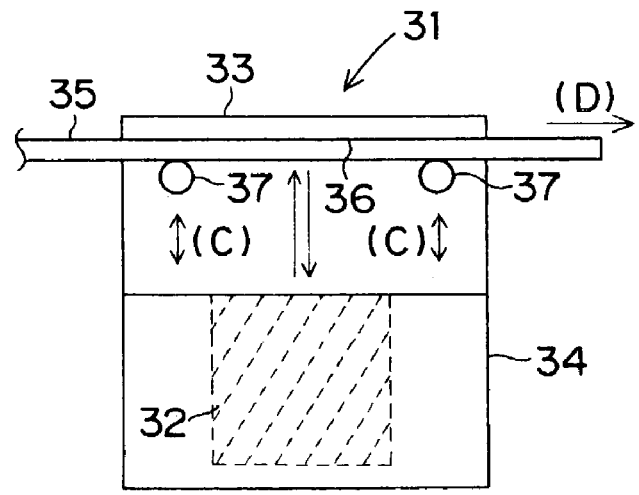
FIG. 5 are configurations of a paper forms thickness detecting device in which the optical distance measuring device shown in FIG. 4 is installed.
Figure 5B:
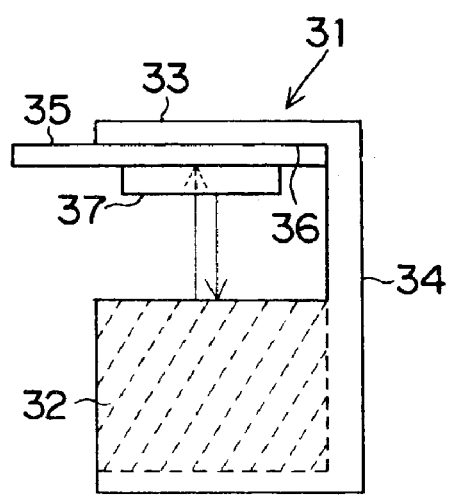

This embodiment relates to a printing apparatus in which the optical distance measuring device of the second embodiment is installed. FIGS. 5A and 5B are configurations of a paper forms thickness detecting device in which the optical distance measuring device is applied to detection of a thickness of a paper form in a printing apparatus. FIG. 5A is a front view and FIG. 5B is a side view.

The paper forms thickness detecting device 31 has a case 34 provided integrally with a sensor section 32 containing the light emission element, an optical system, the photodetector, and the distance measuring means of the second embodiment and with a reference plate 33 facing a top surface of the sensor section 32. The case 34 is provided with a reference surface 36 that is the lowersurface of the reference plate 33 and that guides passage of a measuring object (a paper form) 35 and with a roller 37 (movable in directions of arrows (C) according to a thickness of the paper form 35) that presses the paper form 35 against the reference surface 36, so that the paper form 35 is irradiated with vertical light emitted from the light emission element of the sensor section 32. That is, a guide section is composed of the reference surface 36 and the roller 37.

By the paper forms thickness detecting device 31 configured as described above, a distance to the reference surface 36 being almost a mirror surface can be measured with light from the light emission element of the sensor section 32. Then a distance from the sensor section 32 to a paper form 35 is measured with the paper form 35 pressed against the reference surface 36 by the roller 37, the distance to the paper form 35 is subtracted from the distance to the reference surface 36, and a thickness of the paper form 35 is thus detected.

With movement of the paper form 35 in a direction of an arrow (D) along the reference surface 36 of the reference plate 33, as is the case with the second embodiment, a waveform of detection signal from the photodetector varies according to the distance to the paper form 35. Then an average level value and an amplitude value of the detected waveform are detected by the distance measuring means, and the distance to the paper form 35 and the thickness of the paper form 35 are thereby detected.

Figure 6:
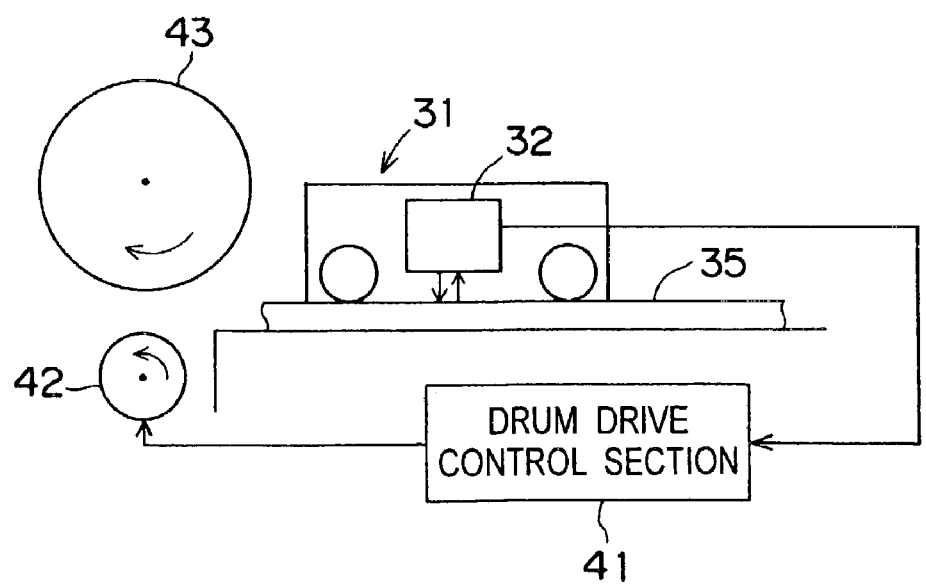
FIG. 6 is a schematic configuration of a printing apparatus in which the paper forms thickness detecting device shown in FIG. 5 is installed.
Figure 7:
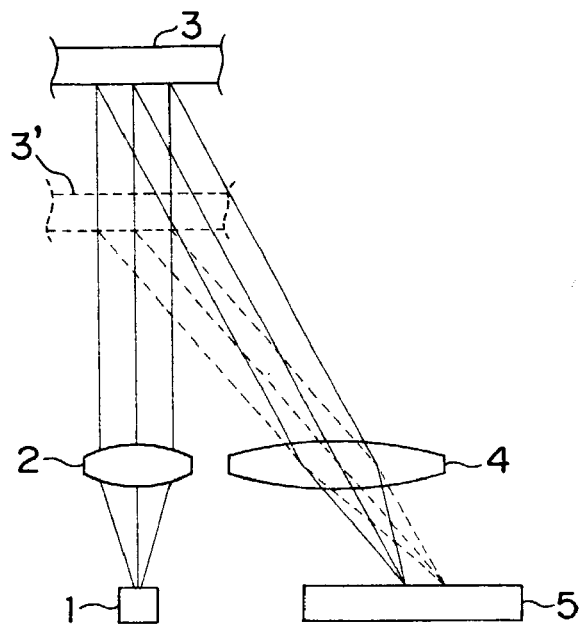
FIG. 7 is a diagram showing a configuration of an optical distance measuring device of a background art.
Figure 8:
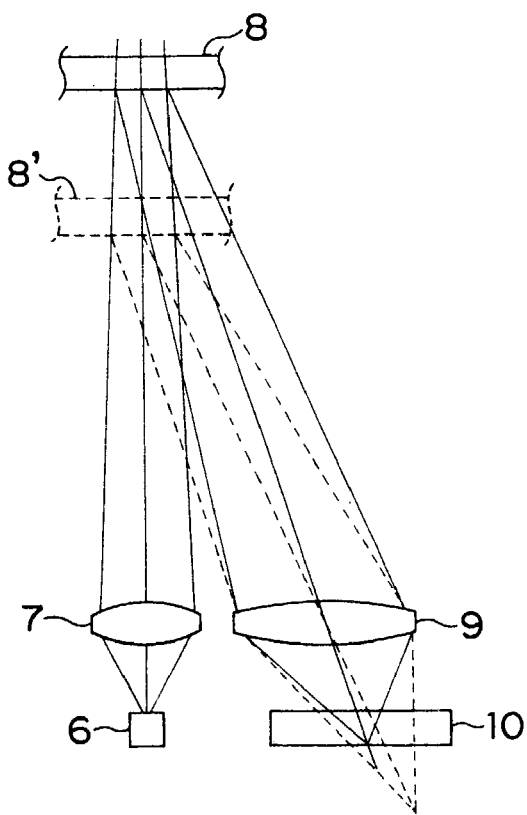
FIG. 8 is a diagram showing a configuration of an optical distance measuring device of a background art different from that of FIG. 7.

FIG. 6 is a schematic configuration of a printing apparatus in which the paper forms thickness detecting device 31 shown in FIG. 5 is installed. The thickness of the paper form 35 detected by the paper forms thickness detecting device 31 with use of the optical distance measuring method is output from the sensor section 32 to a drum drive control section 41. The drum drive control section 41 controls a position of a fixing drum 42 and sets a distance between the fixing drum 42 and a drum 43 so as to match the thickness of the paper form 35. With this operation, fixing state can be optimized and a high-quality printing apparatus can be obtained.

The embodiment has been described as the one in which the optical distance measuring device of the second embodiment is installed. It does not matter, however, if the optical distance measuring apparatus of the first embodiment is installed therein.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical distance measuring device comprising
an objective lens for condensing light emitted from a light emission element, irradiating a surface of a measuring object that is moving which surface extends along a moving direction of the measuring object, and forming a light spot on the surface of the measuring object,
a light receiving lens for condensing light reflected from the light spot formed on the measuring object,
a pinhole-formed body where a pinhole is formed that allows passage of the light condensed by the light receiving lens,
a photodetector on which the light having passed through the pinhole is incident and which outputs light reception signal in response to a quantity of the light, and
distance measuring means for measuring a distance to the measuring object on basis of the light reception signal from the photodetector.

2. An optical distance measuring device as claimed in claim 1, wherein the distance measuring means is configured so as to measure the distance to the measuring object on basis of an output level and an amplitude of the light reception signal.

3. An optical distance measuring device as claimed in claim 1, wherein the light emission element is a semiconductor laser.

4. An optical distance measuring device as claimed in claim 1,
wherein an axis of irradiation light irradiated on the measuring object and an axis of reflected light from the measuring object are positioned on one straight line,
wherein a beam splitter is provided between the light emission element and the objective lens, and
wherein the light receiving lens, the pinhole, and the photodetector are positioned on an axis of the reflected light of which a direction has been changed by the beam splitter.

5. An optical distance measuring device as claimed in claim 4, wherein the axis of the irradiation light irradiated on the measuring object is perpendicular to the irradiated surface of the measuring object.

6. An optical distance measuring device as claimed in claim 1, wherein a diameter of the light spot formed by the objective lens is not smaller than 10 μm and not larger than 30 μm.

7. An optical distance measuring device as claimed in claim 1, wherein a diameter of the pinhole is not smaller than 10 μm and not larger than 50 μm.

8. An optical distance measuring device as claimed in claim 1, wherein the pinhole-formed body is formed integrally on the photodetector.

9. An optical distance measuring device as claimed in claim 1, further comprising a guide section that guides movement of the measuring object when the measuring object is moving.

10. A printing apparatus comprising
a paper forms thickness detecting device that comprises an optical distance measuring device as claimed in claim 1 and that detects a thickness of a paper form as the measuring object, and
a drum drive control section that is informed of the thickness of the paper form detected by the paper forms thickness detecting device and that controls a position of a fixing drum so that a distance between a drum and the fixing drum matches with the thickness of the paper form.

* * * * *